United States Patent [19]

Tanaka et al.

[11] 4,416,214

[45] Nov. 22, 1983

[54] COATING APPARATUS

[75] Inventors: Yasuhinori Tanaka; Hiroshi Chikamasa, both of Odawara, Japan

[73] Assignee: Fuji Photo Film Co., Ltd., Kanagawa, Japan

[21] Appl. No.: 351,387

[22] Filed: Feb. 23, 1982

Related U.S. Application Data

[62] Division of Ser. No. 274,704, Jun. 17, 1981.

[30] Foreign Application Priority Data

Jul. 8, 1980 [JP] Japan ................................. 55-92282

[51] Int. Cl.³ .............................................. B05C 3/02
[52] U.S. Cl. ..................................... 118/410; 118/325; 118/401; 118/411
[58] Field of Search ................ 118/325, 401, 410, 411

[56] References Cited

U.S. PATENT DOCUMENTS

| | | | |
|---|---|---|---|
| 3,052,565 | 9/1962 | Chinn et al. | 118/411 |
| 3,941,902 | 3/1976 | Wennerblom et al. | 118/411 |
| 4,062,492 | 12/1977 | Thornton | 118/411 |
| 4,332,212 | 6/1982 | Jesme | 118/411 X |

Primary Examiner—Bernard D. Pianalto
Attorney, Agent, or Firm—Sughrue, Mion, Zinn, Macpeak and Seas

[57] ABSTRACT

A coating method and coating extruder in which color non-uniformity and stripes in a coated solution on a surface of a continuously-run flexible belt-shaped support are eliminated. Coating solution is supplied from a solution pool of the extruder through a slit at a rate which is greater than that which the coating solution is applied to the support through the slit. A portion of the coating solution is discharged from the solution pool from a position furthers, in the widthwise direction of the support, from the solution supplying point of the solution pool.

3 Claims, 6 Drawing Figures

COATING APPARATUS

This is a division of application Ser. No. 274,704, filed June 17, 1981.

BACKGROUND OF THE INVENTION

The present invention relates to coating methods. More particularly, the invention relates to an improved coating method for forming a coated magnetic recording medium.

The term "coated magnetic recording medium" as herein used is intended to mean a magnetic recording medium which is manufactured by a method in which, while a non-magnetic, flexible and belt-shaped support (hereinafter referred to as "a web" when applicable) is being transported along a predetermined path, a suitable coating liquid is applied to the surface of the web to a desired thickness. This manufacturing process is greatly different from a so-called "non-coated magnetic recording medium" manufacturing process which utilizes ion-plating, sputtering or vacuum deposition.

Coated magnetic recording mediums have been manufactured for recording audio or video signals or for storing digital data using any of gravure, reverse roll, doctor blade or extrusion coating methods. It is difficult with each of the aforementioned conventional methods to greatly increase the coating speed as would provide an increased production rate.

The main factors making it difficult to increase the coating speed are that the thickness of the support is very small, and of the various coating solutions, especially a coating solution for forming a ferromagnetic layer has a thixotrophy effect, or so-called "thixotropic properties", which greatly affects the electromagnetic conversion characteristic.

If, in a coating system having a relatively intricate web path, a thin web is run at high speed, the web has a tendency to be abnormally shifted to one side, bent, creased, or broken.

In a coating system in which the path of a coating solution for forming a ferromagnetic layer has relatively many points where the coating solution can accumulate, the viscosity of the coating solution is liable to increase to an abnormal value or the coating solution is liable to aggregate because of the aforementioned thixotropy property. This may change the electromagnetic conversion characteristic of the ferromagnetic layer greatly.

U.S. patent application Ser. No. 171,509, filed July 23, 1980 by the present applicant disclosed an improved coating method which is intended to eliminate these difficulties. In accordance with that method, an extrusion technique and a doctor blade technique are combined. In the coating method, as shown in FIGS. 1 through 3, a web 4 run continuously at high speed is coated with a magnetic layer coating solution 3 when passing a backing roll 7. The coating solution 3, after being supplied into the solution pool 10 of an extruder 1, is discharged at a predetermined velocity through a slit 2 above the solution pool 10. Excessive amounts of coating solution 3 are scraped off from the coated web 4 by a doctor blade 9 as the web 4 passes a doctor backing roll 8. The doctor blade 9 is disposed to confront the web adjacent the backing roll 8. A smoother 11a is provided between the backing roll 7 and the doctor backing roll 8 in order to smooth the coated film. Similarly, a smoother 11b is disposed downstream of the backing roll 8 to smooth the coated film metered by the doctor blade.

The solution pool 10 is in the form of a cylinder having a diameter of 15 to 20 mm which extends throughout the extruder 1, communicates with the bottom of the slit 2 and is substantially parallel to the slit 2, as shown in FIGS. 2 and 3. One end of the cylindrical solution pool 10 is connected to a solution supplying nozzle 12 while the other end is closed by a closing plate 13 so that, after being filled in the solution pool 10 through the nozzle 12, the coating solution 3 is discharged in the form of a layer through the slit 2. That is, the coating solution 3 is supplied at a predetermined flow rate through the nozzle 12 and is completely discharged through the slit 2. Coating at a high speed of more than 120 m/min can be achieved by the employment of the coating method described above.

However, it has been found that the method still leaves problems to be solved specifically, problems related to the effect of thixotropy of the coating solution on the formation of a ferromagnetic layer and the flow rate of the coating solution supplied to the solution pool 10. For instance, if the amount of coating solution scraped off by the doctor blade 9 is reduced to suppress the occurrence of aggregation due to the recovery of the coating solution scraped off, or the flow rate of the coating solution supplied to the solution pool 10 is decreased so that the peripheral units can be miniaturized with the doctor blade 9 removed, then the coating solution 3 discharged through the portion of the slit 2 which is closer to the solution supplying nozzle 12 is liable to cause non-uniformity in color in the widthwise direction of the web 4, while the coating solution 3 discharged through the portion of the slit 2 which is closer to the closing plate 13 is liable to have stripes formed therein distributed in the widthwise direction of the web 4. It has been confirmed that the above-described color non-uniformity and stripes adversely effect the electromagnetic conversion characteristic of the ferromagnetic layer and result in noise on the tape.

The creation of the stripes may be eliminated by increasing the flow rate of the coating solution. The creation of the stripes by the coating solution 3 which is discharged through the portion of the slit 2 closer to the closing plate 13 is thereby eliminated. However, it has been found that the region where the color non-uniformity occurs tends then not only to include the vicinity of the solution supplying nozzle 12 but also to spread towards the closing plate 13.

The inventors have conducted intensive research and experimentation to determine the causes for the occurrence of the above-described color non-uniformity and stripes and found that the flow rate of the coating solution in the longitudinal direction in the solution pool 10 significantly governs the thixotropy properties. More specifically, the viscosity of the coating solution 3 in the vicinity of the solution supplying nozzle 12 where the flow rate is relatively high tends to be lowered because the coating solution is subjected to shearing action which causes the color nonuniformity. Also, the coating solution in the vicinity of the closing plate 13 where the flow rate is decreased substantially to zero tends to aggregate thus creating the stripes.

An object of the invention is thus to provide a coating method and apparatus in which the above-described difficulties accompanying a conventional coating method have been eliminated, but yet in which the solution supplying means, the coating means, the metering means and the smoothing means are simple in structure.

SUMMARY OF THE INVENTION

The foregoing object and other objects of the invention have been achieved by the provision of a coating method and apparatus in which a film of coating solution is formed by discharging the coating solution through an extruder onto the surface of a flexible belt-shaped support which is run continuously, wherein, according to the invention, the coating solution is supplied to the solution pool of the extruder at a greater rate than that at which the coating solution is applied to the support. A part of the coating solution in the solution pool is allowed to flow out through a position farthest, in the widthwise direction of the support, from the solution supplying point of the solution pool or in the vicinity of that position.

DESCRIPTION OF THE PREFERRED EMBODIMENTS

Preferred embodiments of the invention will be described with reference to the accompanying drawings.

Figure 4:
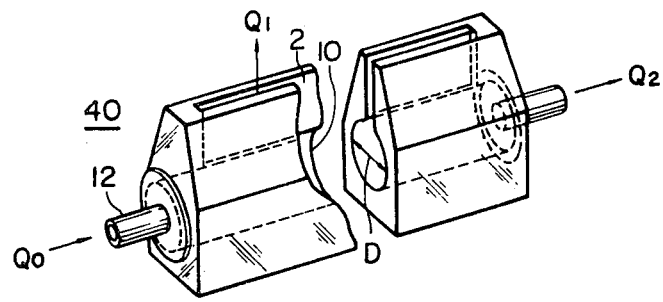
FIGS. 4 through 6 are explanatory diagrams showing preferred embodiments of an apparatus for practicing a coating method according to the invention.
Figure 5:
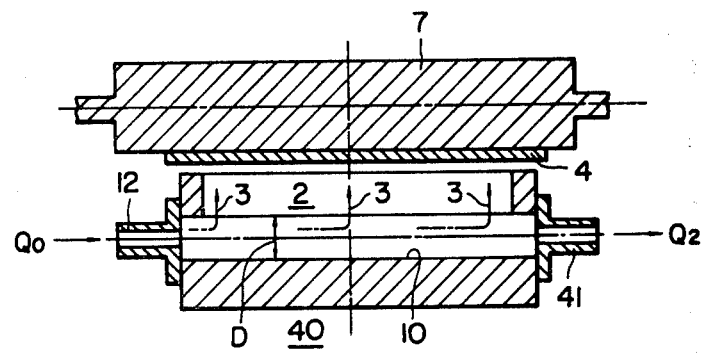

FIGS. 4 and 5 show an extruder which is an essential part of an apparatus for practicing a coating method according to the invention.

Figure 1:
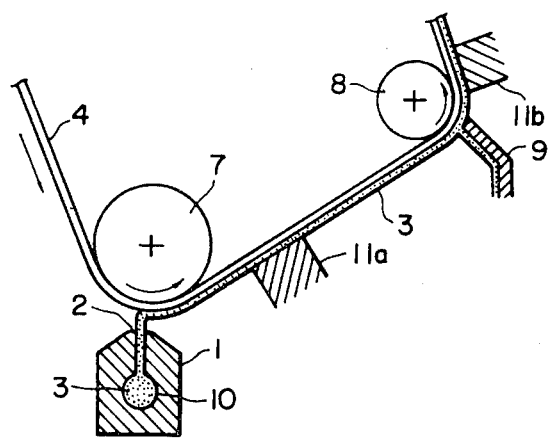
FIGS. 1 through 3 are explanatory diagrams showing essential emponents of a conventional coating apparatus.
Figure 2:
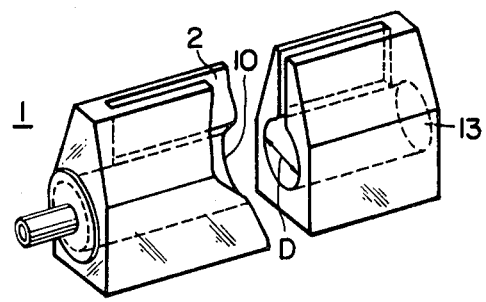
Figure 3:
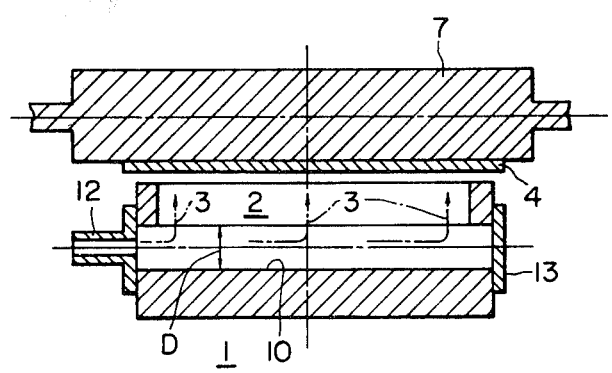

The construction of the extruder 40 of the invention is similar to that of the conventional extruder 1 described above except for the provision of a solution discharging nozzle 41. Accordingly, in FIGS. 4 and 5, those components which have been described with reference to FIGS. 1 through 3 are similarly numbered.

The support 4 is transported at a predetermined speed while being supported by the backing roll 7. The upper end of the slit 2 of the extruder 40 is set perpendicularly to the surface of the support 4 and below the support 4 with a small clearance (usually 2 to 150 mm) between the surface of the support 4 and the upper end of the slit 2. If, under this condition, the coating solution 3 is supplied continuously into the solution pool 10 through the solution supplying nozzle 12 in such a manner that rate $Q_0$ at which the coating solution is supplied (hereinafter referred to as "a solution supplying rate Q") is greater than the rate $Q_1$ at which the coating solution is coated onto the surface of the support 4 (hereinafter referred to as "a solution coating rate $Q_1$"), then after the coating solution 3 has been filled in the entire solution pool 10 and when the solution pressure distribution is substantially uniform in the widthwise direction of the support 4, a part of the coating solution is discharged outside the apparatus through a solution discharging nozzle 41 which is provided at a position which is the most remote, in the widthwise direction of the support 4, from the solution supplying nozzle, namely, at the far end of the solution pool 10.

It is necessary to control the degree of opening of the solution discharging nozzle 41 so that the solution coating rate $Q_1$ is not affected by the rate $Q_2$ at which the coating solution is discharged through the solution discharging nozzle 41 (hereinafter referred to as "a solution discharging rate $Q_2$").

By the solution discharging action of the solution discharging nozzle 41, the remaining coating solution 3 in the solution pool 10 is moved in the widthwise direction of the support 4 without accumulating at any point in the pool 10. Thereafter, the coating solution 3 is applied to the support 4 through the slit 2, which has an opening width of 0.03 to 2 mm, as a result of which a film of coating solution is formed on the surface of the support 4.

It is desirable to increase the solution supplying rate $Q_0$ or to decrease the equivalent diameter D of the solution pool 10 for a coating solution which has a tendency to form the above-described stripes. On the other hand, for a coating solution which tends to result in formation of the above-described color nununiformity, it is preferable to decrease the solution supplying quantity or to increase the diameter of the solution pool 10. In any event, it is essential to control the solution discharing rate $Q_2$ of the solution discharging nozzle 41 in correlation with the solution supplying rate $Q_0$ in such a manner that the solution coating rate $Q_1$ is not greatly affected.

As the coating solution is extruded through the slit 2 without it moving at an excessively high speed in the solution pool 10 and without being accumulated in the pool, the occurrence of the above-described color non-uniformity or stripes which degrades the quality of the product is suppressed in the film of coating solution which is formed on the surface of the support 4 according to the above-described method.

If the solution discharging rate $Q_2$ is controlled so that the solution coating rate $Q_1$ is varied (especially decreased), than a metering process and a smoothing process, which are carried out after the coating process, can be simplified or eliminated.

Figure 6:
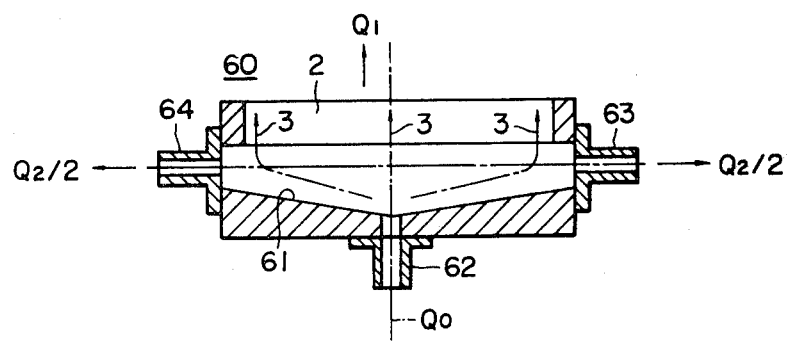

FIG. 6 shows another embodiment of the invention. An extruder 60 shown in FIG. 6 differs from the extruder 40 in FIGS. 4 and 5 in the position of a solution supplying nozzle 62 and the configuration of a solution pool 61. The extruder 60 is of a so-called "central supply system" type in which the solution supplying nozzle 62 is connected to substantially the center of the extruder.

With this extruder, the above-described color nonuniformity and stripes are scarcely caused. However, with some solutions, some color nonuniformity and stripes could occur in the vicinities of both ends of the solution pool 61, which is formed like a ship's bottom, and in the central portion of the solution pool 61. However, this difficulty can be eliminated by providing liquid discharging nozzles 63 and 64 at the ends of the solution pool 61 so that, as was described above, a part of the coating solution is allowed to flow out. By so doing, a film of coating solution uniform in the widthwise direction of the support is obtained.

In the above-described embodiments, the solution discharging nozzles 41 or 63 and 64 are provided at one or both ends of the solution pool, respectively. However, the position of the nozzle 41 and the position of the nozzles 63 ad 64 are not limited thereto or thereby. That is, if a flow path is formed in the vicinity of each of the ends of the extruder, then the end can be closed with a closing plate 13.

If necessary, the extruder 40 or 60 may confront the support 4 with its slit directed downwardly.

Futhermore, according to the invention, a coating method may be employed in which the extruder 40 or 60 is disposed so that the edge of the slit 2 is in direct contact with a part of the surface of the support 4 which is remote from the backing roll 7 and the support 4 is moved slightly away from the edge of the slit 2 by the pressure of the coating solution 2 applied against the support.

It can be readily understood that the method of the invention is advantageously employable not only to coat a support with the above-described magnetic coating solution but also to coat any support with a coating solution in which the support should be coated uniformly in its widthwise direction.

The novel effects of the invention will be clarified with reference to specific examples and comparison examples.

COMPARISON EXAMPLES

Components having compositions as indicated in Table 1 below were sufficiently mixed and dispersed in a ball mill after which 30 parts by weight of epoxy resin (epoxy equivalent 500) were added. These components were uniformly mixed and dispersed to prepare a magnetic coating solution.

TABLE 1

| | |
|---|---|
| γ-Fe$_2$O$_3$ powder (needle-like particles, having an average grain size 0.5μ in the major axis direction, coercive force 320 Oe) | 300 parts by weight |
| Vinyl chloride - vinyl acetate copolymer (copolymerization ratio 87:13, polymerization degree 400) | 30 parts by weight |
| Electrically conductive carbon | 20 parts by weight |
| Polyamide resin (amine value 300) | 15 parts by weight |
| Lecithin | 6 parts by weight |
| Silicon oil (dimethylpolysiloxane) | 3 parts by weight |
| Xylole | 300 parts by weight |
| Methylisobutylketone | 300 parts by weight |
| n-butanol | 100 parts by weight |

The equilibrium viscosity of the magnetic coating solution thus prepared was measured with a "SHIMAZU RHEOMETER RM-1" manufactured by Shimazu Seisakusho of Japan. It indicated 8 poise at a shearing speed of 10 sec$^{-1}$ and 1 poise with a shearing speed 500 sec$^{-1}$.

The above-described magnetic coating solution was applied to a polyethylene terephthalate film support using coating apparatuses shown in FIGS. 1 through 3, under the conditions indicated in Table 2 below. The results are given in Table 3.

TABLE 2

| Coating Conditions | Specimen No. | | | | | |
|---|---|---|---|---|---|---|
| | Comparison Example | | Concrete Example | | | |
| | -1 | -2 | -1 | -2 | -3 | -4 |
| Thickness of coated film, after dried (μ) | 5 | 5 | 5 | 5 | 5 | 5 |
| Thickness of support (μ) | 20 | 20 | 20 | 20 | 20 | 20 |
| Width of support (mm) | 1000 | 1000 | 1000 | 1000 | 1000 | 1000 |
| Coating speed (m/min) | 100 | 100 | 100 | 100 | 100 | 100 |
| Clearance between support slit (mm) | 3 | 3 | 3 | 3 | 3 | 3 |
| Slit opening width (mm) | 0.5 | 0.5 | 0.5 | 0.5 | 0.5 | 0.1 |
| Nozzle discharge direction | Vertically upwardly | Vertically upwardly | Vertically upwardly | Vertically upwardly | Vertically upwardly | Vertically upwardly |
| Solution supplying system | One side | One side | One side | One side | Central | Central |
| Solution pool diameter (mm) | 25 | 15 | 25 | 15 | 15 | 15 |
| Solution supplying rate Q$_0$ (l/min) | 20 | 20 | 40 | 30 | 30 | 10 |
| Solution coating rate Q$_1$ (l/min) | 20 | 20 | 20 | 20 | 20 | 3 |
| Solution discharging rate Q$_2$ (l/min) | 0 | 0 | 20 | 10 | 10 | 7 |

EXAMPLES OF THE INVENTION

The same coating solution as that in the above-described comparison examples was applied to supports by using apparatuses as shown in FIGS. 4 through 6 under the conditions that are indicated in Table 2. The results were as indicated in Table 3.

TABLE 3

| Specimen No. | Result | |
|---|---|---|
| | Surface condition | Reproduction output |
| Comparison example | | |
| -1 | Many stripes extending from center towards side opposite solution supplying side | Greatly variable in region of stripes |
| -2 | Great deal of color nonuniformity from solution supplying side to center | Greatly variable in region of color nonuniformity |
| Concrete example | | |
| -1 | Satisfactory in all regions | Stable in all regions |
| -2 | Satisfactory in all regions | Stable in all regions |
| -3 | Satisfactory in all regions | Stable in all regions |
| -4 | Satisfactory in all regions | Stable in all regions |

It has been clearly demonstrated from the above-described results that the coating method of the invention wherein coating solution is allowed to flow out of the solution pool is considerably effective in improving and unifying the surface quality, in the widthwise direction, of the magnetic recording medium and stabilizing the reproduction output.

In speciment No. 4, the doctoring process which is usually effected after the coating process with the extruder was eliminated. However, in this case also, the results are satisfactory. Thus, the coating operation and apparatus can be simplified with the use of the invention.

What is claimed is:

1. An extruder for supplying a coating solution onto a surface of a continuously-run flexible belt-shaped support comprising: an extruder body having a solution pool formed therein and a slit extenting longitudinally therefrom, said solution pool communicating with said slit, a coating solution inlet port formed at one end of said extruder body along a length wise direction of said slit, and a coating solution discharge port formed in said extruder body at the end thereof opposite said end in which said coating solution supplying port is formed.

2. An extruder for supplying a coating solution onto a surface of a continuously-run flexible belt-shaped support comprising: an extruder body having a solution pool formed therein, a slit in said extruder body communicating with said solution pool, a coating solution inlet port formed at a center bottom portion of said solution pool, and first and second coating solution discharge ports formed at opposite end positions of said extruder body with respect to a lengthwise direction of said slit.

3. The extruder as claimed in claim 2, wherein a bottom portion of said solution pool has a V-shaped cross section.

* * * * *